(12) United States Patent
Cao et al.

(10) Patent No.: US 9,785,286 B2
(45) Date of Patent: Oct. 10, 2017

(54) TOUCH DISPLAY PANEL AND DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Zhaokeng Cao, Shanghai (CN); Qiong Song, Xiamen (CN); Poping Shen, Kiamen (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/221,301

(22) Filed: Jul. 27, 2016

(65) Prior Publication Data
US 2017/0177159 A1 Jun. 22, 2017

(30) Foreign Application Priority Data
Dec. 16, 2015 (CN) .......................... 2015 1 0946359

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0412* (2013.01); *G06F 2203/04111* (2013.01)

(58) Field of Classification Search
CPC ....................................................... G06F 3/044
See application file for complete search history.

(56) References Cited

U.S. PATENT DOCUMENTS

| | | | |
|---|---|---|---|
| 2015/0145821 A1* | 5/2015 | Kim ....................... | G06F 3/0412 345/174 |
| 2015/0199930 A1* | 7/2015 | Sasaki .................. | G09G 3/2007 345/55 |
| 2016/0041666 A1* | 2/2016 | Lee ....................... | G02F 1/13338 345/174 |
| 2016/0187694 A1* | 6/2016 | Kim ....................... | G06F 3/0412 349/12 |
| 2016/0246425 A1* | 8/2016 | Liu ......................... | G06F 3/044 |
| 2016/0291790 A1* | 10/2016 | Yao ........................ | G06F 3/0418 |

FOREIGN PATENT DOCUMENTS

CN        103941498 A        7/2014

* cited by examiner

*Primary Examiner* — Sanghyuk Park
(74) *Attorney, Agent, or Firm* — Kilpatrick Townsend & Stockton LLP

(57) ABSTRACT

The disclosure provides a touch display panel and a display device. The touch display panel includes a substrate, a plurality of scan lines, a plurality of data lines, pixel units, touch electrodes and a plurality of touch lines. Pixel electrodes in each pixel unit include a plurality of strip electrodes, and two adjacent pixel units form a unit group including a first pixel unit and a second pixel unit. The first pixel unit includes a first part and a second part. The second pixel unit includes a third part and a fourth part. The first pixel unit and the second pixel unit are in concave-convex fit arrangement. Each touch line is electrically connected to a corresponding touch electrode via a through hole located between the second part and the fourth part.

10 Claims, 7 Drawing Sheets

TOUCH DISPLAY PANEL AND DISPLAY DEVICE

CROSS-REFERENCES TO RELATED APPLICATIONS

This application claims priority to Chinese Patent Application No. 201510946359.2, filed with the Chinese Patent Office on Dec. 16, 2015 and entitled "Touch Display panel and display device", the contents of which are incorporated herein by reference in their entirety.

TECHNICAL FIELD

The present disclosure relates to the technical field of display, and in particular to a touch display panel and a display device.

BACKGROUND

With continuous evolution of intelligent mobile devices, requirements such as high resolution of pixel, light and thin structure, narrow frame and the like are expressed continuously. In order to enable display panels to be thinner and lighter, each display panel manufacturer explores integration of an external touch panel with a liquid crystal display panel. However, technology is complex and cost is high when manufacturing a component for integrating a touch panel with a liquid crystal panel under high resolution of pixel. It is a major problem perplexing industries for manufacturing in-cell touch liquid crystal panels under high resolution of pixel by utilizing a low-cost technology.

FIG. 1 is a schematic structural diagram showing four kinds of touch display panels in the related art. As shown in FIG. 1, in an existing structure 1, each pixel unit includes a strip pixel electrode a1; a touch line b1 and a through hole c1 of a touch electrode are arranged between two adjacent columns of pixel units. In an existing structure 2, each pixel unit includes a strip pixel electrode a1; a touch line b1 and a through hole c1 of a touch electrode are arranged between two adjacent rows of pixel units. In an existing structure 3, each pixel unit includes two strip pixel electrodes a1 and a2; a touch line b1 and a through hole c1 of a touch electrode are arranged between two adjacent columns of pixel units. In an existing structure 4, each pixel unit includes two strip pixel electrodes a1 and a2; a touch line b1 and a through hole c1 of a touch electrode are arranged between two adjacent rows of pixel units. The existing structures 1 and 2 would lower transmittance of a display panel, and the existing structures 4 and 3 would partially enhance transmittance of a display panel, but is likely to cause serious color offset of a display panel. In addition, liquid crystals at a connecting part where the touch electrode and the touch line are connected via a through hole cannot be effectively controlled by an electric field, i.e., black domain lines are likely to occur at c1 in FIG. 1, resulting in decrease of aperture ratio of a display panel and influence on display effect.

SUMMARY

The disclosure provides a touch display panel and a display device so as to enhance aperture ratio and transmittance of a display panel, and reduce effect of color offset.

On the one hand, embodiments of the disclosure provide a touch display panel. The touch display panel includes: a substrate, a plurality of scan lines, a plurality of data lines, pixel units, a plurality of touch electrodes and a plurality of touch lines.

In those embodiments, the plurality of scan lines and the plurality of data lines are arranged at a first side of the substrate.

In those embodiments, the pixel units are positioned in encircled regions of adjacent scan lines and adjacent data lines. A pixel electrode in each pixel unit includes a plurality of strip electrodes which extend along a first direction and are configured along a second direction. The first direction intersects the second direction. Two adjacent pixel units form a unit group, and the two pixel units in the unit group are respectively a first pixel unit and a second pixel unit. The first pixel unit includes a first part extending along the first direction and a second part extending from the end region of the first part to the second pixel unit. The second pixel unit includes a third part extending along the first direction and a fourth part extending from the end region of the third part to the first pixel unit. The first pixel unit and the second pixel unit are in concave-convex fit arrangement. A length of strip electrodes in the second part and the fourth part along the first direction is less than a length of strip electrodes in the first part and the third part along the first direction.

The plurality of touch electrodes are arranged at the first side of the substrate and are configured in an array mode. Each touch electrode overlaps a plurality of pixel units in a direction perpendicular to the substrate.

The plurality of touch lines are arranged at the first side of the substrate. Each touch line is electrically connected to a corresponding touch electrode via a through hole, and the corresponding through holes are formed between the second part and the fourth part.

On the other hand, embodiments of the disclosure further provide a touch display device including the touch display panel described on the one hand.

DETAILED DESCRIPTION

The disclosure is further described in detail in conjunction with accompanying drawings and embodiments. It should be understood that the particular embodiments described here are only used for explaining the disclosure, rather than limiting thereto. In addition, it also should be noted that parts relevant to the disclosure, rather than the whole structure, are merely shown in the accompanying drawings for the convenience of description.

Figure 2:
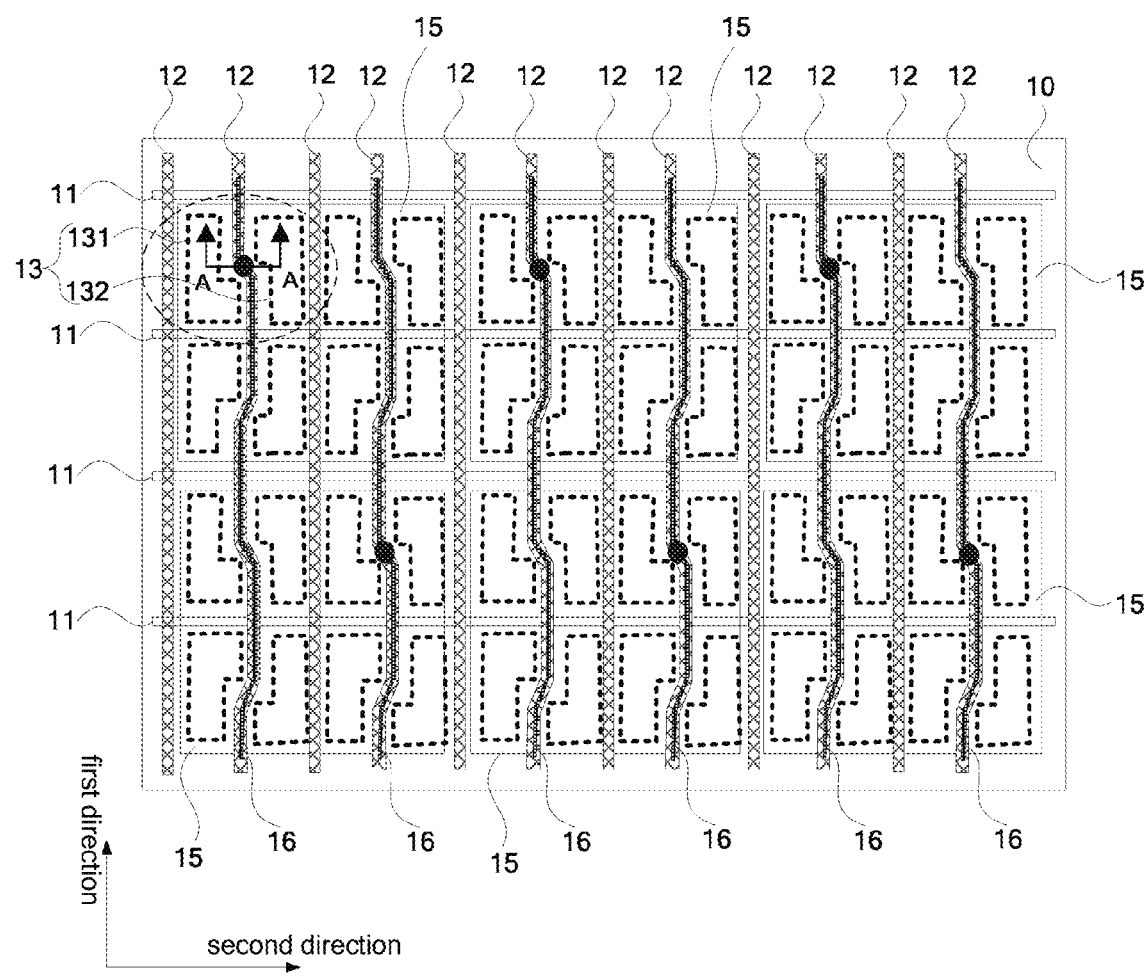
FIG. 2 is a top view showing a structure of a touch display panel provided by embodiments of the disclosure.
Figure 3:
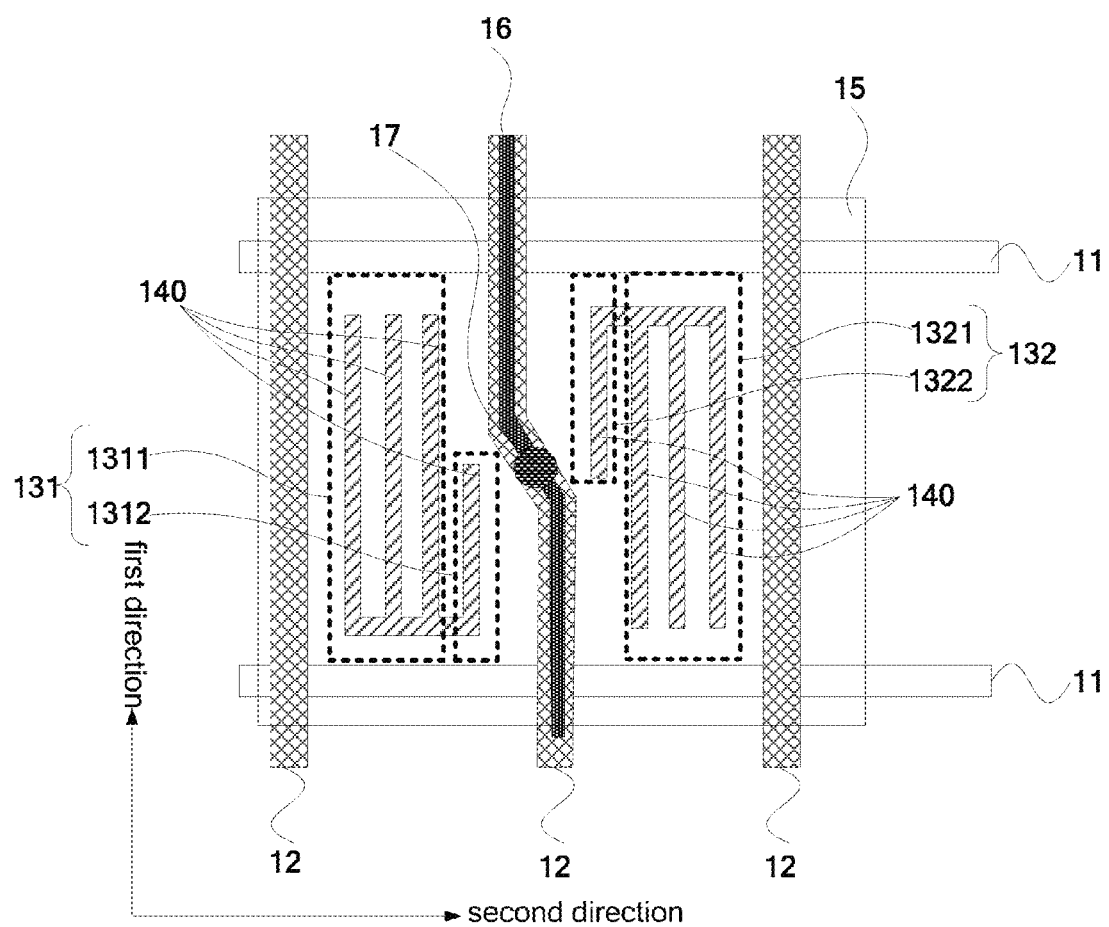
FIG. 3 is a partially enlarged view showing a pixel unit group in FIG. 2.

FIG. 2 is a top view showing a structure of a touch display panel provided by an embodiment. FIG. 3 is a partially enlarged view showing a pixel unit group in FIG. 2. As shown in FIG. 2 and FIG. 3, the touch display panel includes: a substrate 10, a plurality of scan lines 11 and a plurality of data lines 12, both of which are arranged at a first side of the substrate 10. As can be seen, the plurality of scan lines 11 are arranged in sequence, and the plurality of data lines 12 are arranged in sequence, and the scan lines 11 and the data lines 12 intersect with each other. With respect to the pixel units positioned in regions encircled by adjacent scan lines 11 and adjacent data lines 12, pixel electrodes in each of those pixel units include a plurality of strip electrodes 140 extending along a first direction and arranging along a second direction, where the first direction intersects the second direction. As also can be seen, two adjacent pixel units form a unit group 13, and the two pixel units in the unit group 13 are respectively a first pixel unit 131 and a second pixel unit 132. As shown in FIG. 3, the first pixel unit 131 includes a first part 1311 extending along the first direction, and a second part 1312 extending from an end region of the first part 1311 to the second pixel unit 132. The second pixel unit 132 includes a third part 1321 extending along the first direction, and a fourth part 1322 extending from an end region of the third part 1321 to the first pixel unit 131. The first pixel unit 131 and the second pixel unit 132 are in concave-convex fit arrangement. A length of strip electrodes 140 in the second part 1312 and the fourth part 1322 along the first direction is less than a length of strip electrodes in the first part 1311 and the third part 1321 along the first direction. A plurality of touch electrodes 15 arranged at the first side of the substrate 10 and arranged as an array, where each touch electrode 15 overlaps a plurality of pixel units in a direction vertical to the substrate. As still can be seen, a plurality of touch lines 16 arranged at the first side of the substrate 10, where each touch line 16 is electrically connected to a corresponding touch electrode 15 via a through hole 17 positioned between the second part 1312 and the fourth part 1322.

It should be noted although the first direction and second direction are shown in FIG. 2 to intersect at a 90 degree, this is merely illustrative. The first and second directions can intersect at any other degree, such as 60 degree, 120 degree and so on. For convenience of description, two rows and three columns of touch electrodes 15 are arranged schematically in FIG. 2, and each touch electrode 15 covers two rows and two columns of pixel units. Each pixel unit in FIG. 3 is schematically arranged to include four strip electrodes, which are not intended to be limiting. Each pixel unit is defined by adjacent scan lines 11 and adjacent data lines 12 in FIG. 2. Because the first pixel unit 131 and the second pixel unit 132 are in concave-convex fit arrangement, data lines 12 between the first pixel unit 131 and the second pixel unit 132 are required to fit shapes of the first pixel unit 131 and the second pixel unit 132 to buckle at a concave-convex fitting portion. In addition, the above touch display panel further includes other components for supporting the touch display panel to operate normally, such as thin film transistors arranged at intersections of scan lines 11 and data lines 12, where gates of the thin film transistors are electrically connected to scan lines 11; source electrodes (or drain electrodes) of the thin film transistors are electrically connected to data lines 12; and drain electrodes (or source electrodes) of the thin film transistor are electrically connected to pixel electrodes. Scan lines 11 are used for providing scanning drive signals for the touch display panel, and data lines 12 are used for providing data signals for the touch display panel.

Regarding the touch display panels shown in FIG. 2 and FIG. 3, because first pixel unit 131 and second pixel unit 132 are in a concave-convex fit, liquid crystal molecules at a concave-convex fitting portion of first pixel unit 131 and second pixel unit 132 are driven simultaneously by pixel electrodes of first pixel unit 131 and second pixel unit 132 at both sides, so that black electrode domain lines are likely to occur. In various embodiments, through holes 17 for connecting touch electrodes 15 and touch lines 16 are arranged at a concave-convex fitting portion between the first pixel unit 131 and the second pixel unit 132, i.e., through holes 17 are arranged at a location where black electrode domain lines are likely to occur so as to achieve electrical connection between touch electrodes 15 and touch lines 16, thereby preventing a problem that aperture ratio is reduced due to configuration of through holes in other parts of the touch display panel.

Figure 4:
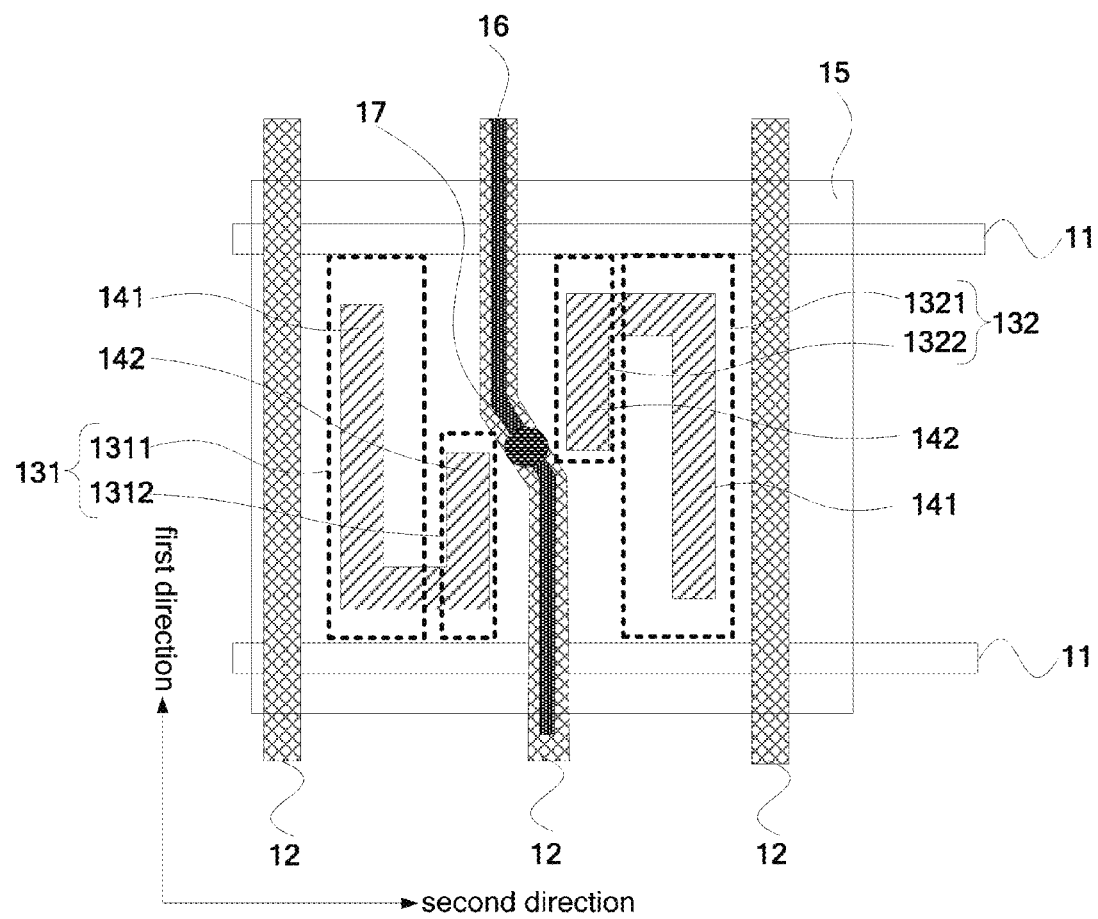
FIG. 4 is a partially enlarged view showing another pixel unit group provided by embodiments of the disclosure.

FIG. 4 is a partially enlarged view showing another pixel unit group provided by embodiments of the disclosure. Differences between FIG. 4 and above embodiments are that each pixel unit includes two strip electrodes which are respectively a first strip electrode 141 and a second strip electrode 142, where the first strip electrode 141 is positioned in the first part 1311 or the third part 1321. The second strip electrode 142 in FIG. 4 is positioned in the second part 1312 or the fourth part 1322. The second strip electrode 142 of the second part 1312 of the first pixel unit 131 and the second strip electrode 142 of the fourth part 1322 of the second pixel unit 132 in a unit group extend along opposite directions.

With continuous pursuit to resolution ratio of touch display panel, size of each pixel unit is required to be reduced as much as possible. In a touch display panel shown in FIG. 4, each pixel unit includes two strip electrodes, so that integration of a touch panel and a display panel under high pixel resolution ratio is realized.

In some embodiments, a length of strip electrodes 140 in the second part 1312 and the fourth part 1322 along the first direction is 40%-60% of a length of strip electrodes in the first part 1311 and the third part 1321 along the first direction. In some other embodiments, a length of strip electrodes 140 in the second part 1312 and the fourth part 1322 along the first direction is arranged to be 50% of length of strip electrodes 140 in the first part 1311 and the third part 1321 along the first direction. Such a configuration has an advantage that the first pixel unit 131 and the second pixel unit 132 in each unit group are symmetrical centrally without leading to color offset of the touch display panel.

In some embodiments, referring to FIG. 2 and FIG. 3, touch lines 16 are arranged along an extension direction of data lines 12 between first pixel unit 131 and second pixel unit 132, and correspond to positions of data lines 12. Touch lines 16 are arranged to be corresponding to positions of data lines 12, and orthographic projection of data lines 12 on the substrate 10 overlaps orthographic projection of touch lines 16 on the substrate 10, so as to guarantee that touch lines 16 would not affect aperture ratio of each pixel unit.

In some embodiments, touch electrodes are multiplexed as common electrodes. Touch electrodes and common electrodes are multiplexed, so that thickness of the touch display panel can be further reduced, and moreover, only one etching process is required during manufacturing without individually manufacturing masks for touch electrodes and common electrodes, so that cost is lowered, amount of manufacturing procedures is reduced, and production efficiency is enhanced.

In some embodiments, as shown in FIG. 2, touch electrodes 15 are used for self-capacitive touch detection. Touch electrodes 15 in array configuration constitute a self-capacitive touch screen, and each touch line 16 is electrically connected with a corresponding touch electrode 15. When any touch electrode 15 is touched by fingers of a user, capacitance between the touch electrode 15 and ground is changed and a touch signal is generated, the touch signal is transmitted to a processor of the touch display panel by the corresponding touch line 16 connected with the touch electrode 15, and the processor can obtain the position of the touch electrode 15 touched by fingers of the user by calculating the obtained touch signal. Because touch electrodes 15 of the present embodiment are used for self-capacitive touch detection, and touch electrodes 15 in array configuration form capacitors with ground, so that the touch display panel has high electromagnetic interference capability.

Figure 5:
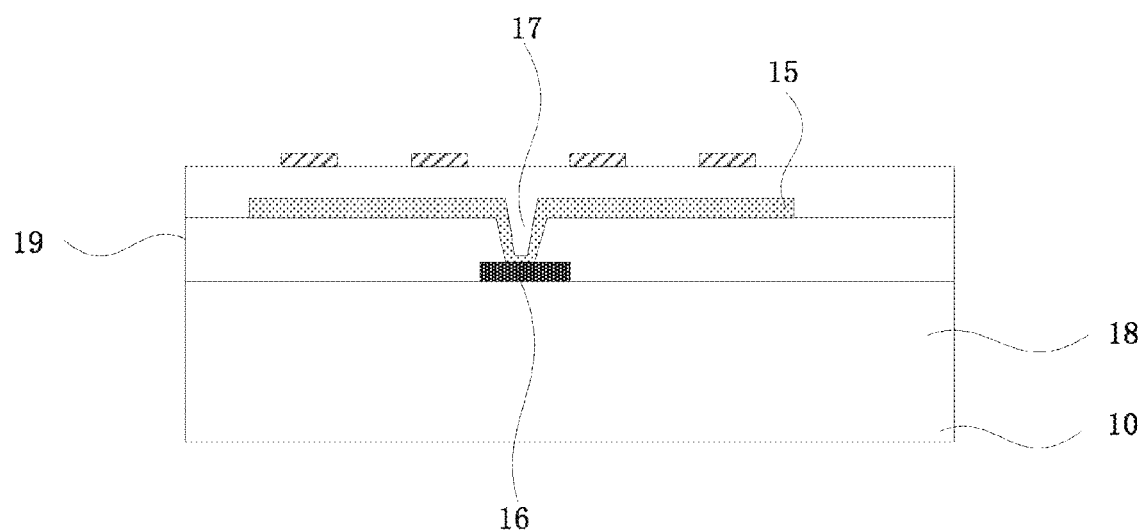
FIG. 5 is a sectional view showing a structure along an AA direction in FIG. 2.

FIG. 5 is a sectional view showing a structure along an AA direction in FIG. 2. The touch display panel is an optimization based on each embodiment above. Differences between the touch display panel and each embodiment above are that the touch display panel further includes a planarization layer 18 arranged on the substrate 10. As can be seen, touch lines 16 are arranged at one side of the planarization layer 18 facing away from the substrate 10. One side of each touch line 16 far away from the substrate 10 is covered by a first passivation layer 19. Through holes 17 are formed in the passivation layer 19. Touch electrodes 15 are arranged at one side of the first passivation layer 19 away from the substrate 10, and are electrically connected with touch lines 16 via through holes 17.

Figure 6:
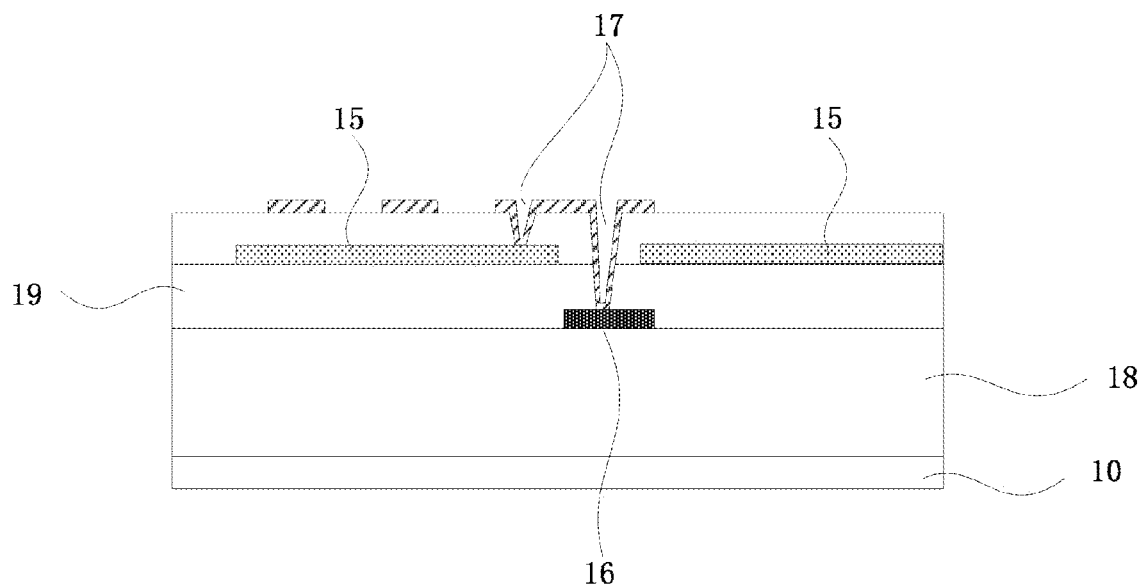
FIG. 6 is a sectional view showing another structure along an AA direction in FIG. 2.

FIG. 6 is a sectional view showing another structure along an AA direction in FIG. 2. FIG. 6 is different from FIG. 5 that through holes 17 electrically connecting touch line 16 and touch electrode 15 have a bridge connection structure.

Figure 1:
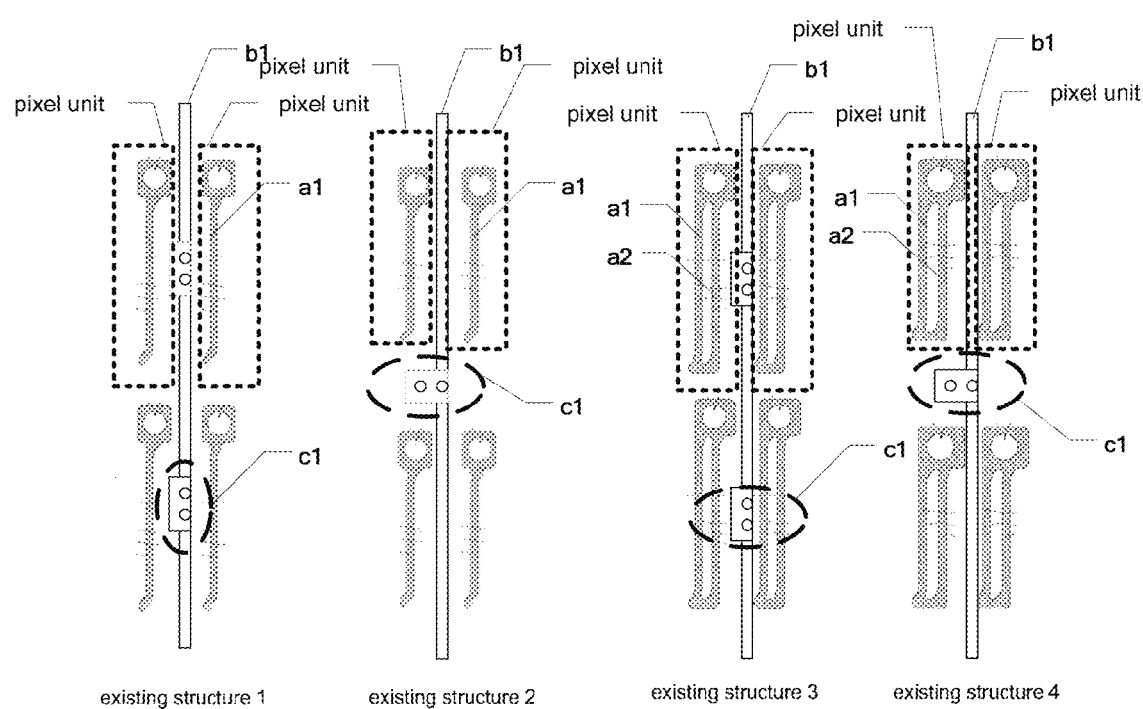
FIG. 1 is a schematic diagram showing structures of four touch display panels in the related art.

In various embodiments, display performances of the touch display panel in FIG. 1 and the touch display panel provided in FIG. 4 are tested, and test results are shown in table 1:

TABLE 1 test results showing display performances of the touch display panel provided in FIG. 1 and the touch display panel provided in FIG. 4

| Structure type | Transmittance % | Distance between adjacent pixel units (technological difficulty) | Blinking phenomenon | Color offset | Comprehensive assessment |
|---|---|---|---|---|---|
| existing structure 1 in FIG. 1 | 3.74% | long (low difficulty) | Relatively great | none | ordinary |
| existing structure 2 in FIG. 1 | 3.45% | long (low difficulty) | Relatively great | none | ordinary |
| existing structure 3 in FIG. 1 | 4.05% | short (great difficulty) | Relatively tiny | serious | ordinary |
| existing structure 4 in FIG. 1 | 3.63% | short (great difficulty) | Relatively tiny | serious | ordinary |
| touch display panel provided in FIG. 4 | 3.85% | long (low difficulty) | moderate | Very small | good |

Referring to table 1, an interval between adjacent pixel units of the touch display panel provided in FIG. 4 is greater than that of the existing structure 3 and the existing structure 4 in FIG. 1, so that technological difficulty during manufacturing can be lowered. In addition, transmittance of the touch display panel provided in FIG. 4 is greater than that of the existing structure 1 and the existing structure 2 in FIG. 1, and there is almost no color offset phenomenon.

Figure 7:
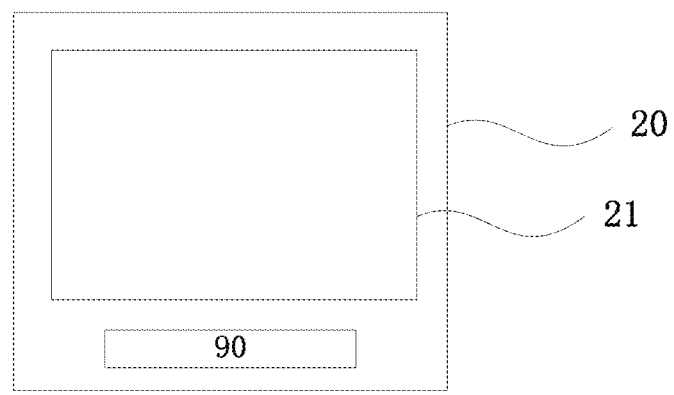
FIG. 7 is a schematic diagram showing a structure of a touch display device provided by embodiments of the disclosure.

Embodiments further provide a touch display device. FIG. 7 is a schematic diagram showing a structure of a touch display device provided by embodiments of the disclosure. As shown in FIG. 7, a touch display device 20 includes a touch display panel 21 described in each embodiment above. It should be noted that the touch display device 20 further includes various components for supporting normal operation of the touch display device 20, such as a driving circuit 90. The touch display device 20 may be, for example, a touch cell phone, a tablet computer, electronic paper and the like.

It should be noted that the content above is merely the preferable embodiments and the applied technical principle of the disclosure. It should be understood by a person skilled in the art that the disclosure is not limited to the specific embodiments, and various obvious modifications, readjustment and substitutions can be made without departing from the protection scope of the disclosure for the person skilled in the art. Therefore, although the disclosure is described in detail by embodiments above, the disclosure is not merely limited thereto, and also can include other more equivalent embodiments without departing from the concept of the disclosure. The scope of the disclosure is determined by the scope of the attached claims.

The invention claimed is:

1. A touch display panel, comprising a substrate;
a plurality of scan lines and a plurality of data lines, the scan lines and data lines being arranged at a first side of the substrate;
pixel units positioned in regions encircled by adjacent scan lines and adjacent data lines, wherein
pixel electrodes in each pixel unit comprise a plurality of strip electrodes extending along a first direction and arranging along a second direction, wherein the first direction intersects the second direction;
two adjacent pixel units form a unit group, and the two pixel units in the unit group are respectively a first pixel unit and a second pixel unit, wherein the first pixel unit comprises a first part extending along the first direction, and a second part extending from an end region of the first part to the second pixel unit;
the second pixel unit comprises a third part extending along the first direction, and a fourth part extending from an end region of the third part to the first pixel unit;
the first pixel unit and the second pixel unit are in concave-convex fit arrangement; and
a length of strip electrodes in the second part and the fourth part along the first direction is less than a length of strip electrodes in the first part and the third part along the first direction;
a plurality of touch electrodes arranged at the first side of the substrate and arranged as an array, wherein each touch electrode overlaps a plurality of pixel units in a direction vertical to the substrate; and
a plurality of touch lines arranged at the first side of the substrate, wherein each touch line is electrically connected to a corresponding touch electrode via a through hole positioned between the second part and the fourth part.

2. The panel according to claim 1, wherein
   each pixel unit comprises two strip electrodes which are respectively a first strip electrode and a second strip electrode, wherein
   the first strip electrode is positioned in the first part or the third part;
   the second strip electrode is positioned in the second part or the fourth part; and
   the second strip electrode of the second part of the first pixel unit and the second strip electrode of the fourth part of the second pixel unit in a unit group extend along opposite directions.

3. The panel according to claim 1, wherein the length of strip electrodes in the second part and the fourth part along the first direction is 40%-60% of the length of strip electrodes in the first part and the third part along the first direction.

4. The panel according to claim 1, wherein
   touch lines are arranged along an extension direction of data lines between the first pixel unit and the second pixel unit, and correspond to positions of data lines.

5. The panel according to claim 1, wherein touch electrodes are multiplexed as common electrodes.

6. The panel according to claim 1, wherein touch electrodes are used for self-capacitive touch detection.

7. The panel according to claim 1, further comprising a planarization layer arranged on the substrate, wherein
   touch lines are arranged at one side of the planarization layer far away from the substrate;
   one side of each touch line away from the substrate is covered with a first passivation layer; through holes are formed in the passivation layer; and
   touch electrodes are arranged at one side of the first passivation layer far away from the substrate, and are electrically connected with touch lines via through holes.

8. A touch display device, comprising a touch display panel, wherein the touch display panel comprises:
   a substrate;
   a plurality of scan lines and a plurality of data lines, the scan lines and data lines being arranged at a first side of the substrate;
   pixel units positioned in regions encircled by adjacent scan lines and adjacent data lines, wherein
   pixel electrodes in each pixel unit comprise a plurality of strip electrodes extending along a first direction and arranging along a second direction, wherein the first direction intersects the second direction;
   two adjacent pixel units form a unit group, and the two pixel units in the unit group are respectively a first pixel unit and a second pixel unit, wherein the first pixel unit comprises a first part extending along the first direction, and a second part extending from an end region of the first part to the second pixel unit;
   the second pixel unit comprises a third part extending along the first direction, and a fourth part extending from an end region of the third part to the first pixel unit;
   the first pixel unit and the second pixel unit are in concave-convex fit arrangement; and
   a length of strip electrodes in the second part and the fourth part along the first direction is less than a length of strip electrodes in the first part and the third part along the first direction;
   a plurality of touch electrodes arranged at the first side of the substrate and arranged as an array, wherein each touch electrode overlaps a plurality of pixel units in a direction vertical to the substrate; and
   a plurality of touch lines arranged at the first side of the substrate, wherein each touch line is electrically connected to a corresponding touch electrode via a through hole positioned between the second part and the fourth part.

9. The device according to claim 8, wherein
   touch lines are arranged along an extension direction of data lines between the first pixel unit and the second pixel unit, and are corresponding to positions of data lines.

10. The device according to claim 8, wherein touch electrodes are used for self-capacitive touch detection.

* * * * *